C. A. SCHAEFER,

Assignor, by mesne assignments, to O. S. JUDD.

Sash-Supporter.

No. 8,672. Reissued April 15, 1879.

Witnesses

W. B. Thomson.

P. J. Markley.

Inventor.

Charles A. Schaefer.

By James Shepard Atty.

N. PETERS, PHOTO-LITHOGRAPHER, WASHINGTON, D. C.

UNITED STATES PATENT OFFICE.

CHARLES A. SCHAEFER, OF CHICAGO, ILLINOIS, ASSIGNOR, BY MESNE ASSIGNMENTS, TO OLIVER S. JUDD, OF NEW BRITAIN, CONNECTICUT.

IMPROVEMENT IN SASH-SUPPORTERS.

Specification forming part of Letters Patent No. 64,911, dated May 21, 1867; Reissue No. 8,672, dated April 15, 1879; application filed March 1, 1879.

*To all whom it may concern:*

Be it known that I, CHARLES A. SCHAEFER, of Chicago, in the county of Cook and State of Illinois, have invented certain new and useful Improvements in Sash-Supporters; and I do hereby declare that the following is a full, clear, and exact description of the construction and operation of the same, reference being had to the accompanying drawings, and letters of reference marked thereon, making a part of this specification.

The object of my invention is to provide means for holding loose sashes in window-frames in such a manner as to prevent a lateral motion or rattling; also, to provide cheap and convenient means for securing the device in place; and the invention consists in the cylindrical screw-case, adapted to be placed and secured in position by screwing it into the jamb-casing; also, in the combination, with said case, of a longitudinally-moving and flat-sided plunger, fitted into a flat-sided bearing in said case; also, in a general combination of parts, all as hereinafter described.

By my invention the device is very conveniently secured in place, and when secured it holds the sash in position to be easily run up and down in the window-frame, and presses the sash against the side of the frame which is opposite the sash-supporter.

Figure 1:
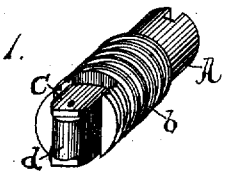
Figure 2:
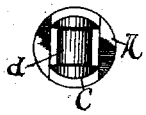
Figure 3:
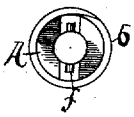

In the accompanying drawings, Figure 1 is a perspective view of a sash-supporter which embodies my invention. Fig. 2 is a front-end view of the same. Fig. 3 is a rear-end view of the same, and Fig. 4 is a central and longitudinal section of the same.

A designates the cylindrical case, having the screw-thread *b* on its periphery, in order that it may be secured to the jamb-casing *m* by merely turning it into a hole of a proper size formed in said casing. The interior of this case is hollow, an axial opening extending its whole length. At the inner end the case is contracted to partially inclose one end of this opening, while the side walls of the hole in said contracted portion form one of the bearings for the shouldered plunger, hereinafter described.

Figure 4:
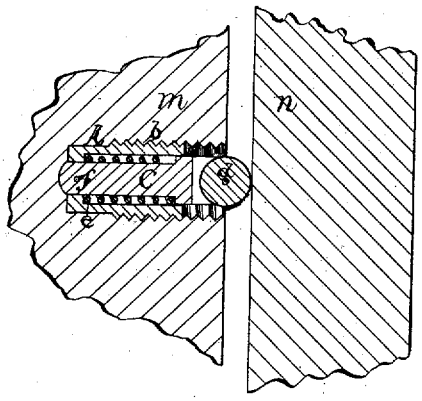

The portion of the case which surrounds the outer end of this axial opening forms the outer bearing for said plunger, and the intermediate space constitutes the spring-chamber, which, when the plunger is inserted, is inclosed at the inner end by the end of the case, and at the outer end by the head of the shouldered plunger C, as shown in Fig. 4. The outer end of this plunger is flat on two sides, said sides being parallel to each other, and the opening in the front end of the case is of corresponding shape, as shown in Fig. 2, so as to prevent the rotation of said plunger C within the case, and, also, so that a wrench may be applied to its projecting end to screw the case into the jamb-casing *m*.

From the foregoing it will be seen that the essential function of the shape of the outer end of the plunger, (in cross-section,) and the corresponding walls which form one bearing for said plunger, is that the plunger cannot rotate within and independent of the case, and that a wrench may be applied to the projecting end of said plunger. This plunger C is adjusted to move longitudinally in the case A, and is held in place by the pin *f*. It is also provided with a friction-roller, *d*, secured to its forked outer end.

One end of the spring *c* within the case bears against a shoulder on the plunger, and the other end of said spring bears against the case at the rear end of the longitudinal spring-chamber, so as to continually press the plunger outward.

To secure the device in place it is only necessary to make a hole of a suitable size—to wit, about equal to the diameter of the case at the bottom of the screw-thread—when the case can be turned in by means of a wrench to such a depth as will allow the full force of the spring *c* to press the roller *d* against the sash *n*, and permit the plunger to have a longitudinal movement for overcoming the inequalities in the width of the sash.

I claim as my invention—

1. In a sash-supporter, the cylindrical case having a screw-thread on its periphery, an internal longitudinal spring-chamber, and two bearings for the plunger, substantially as described, and for the purpose specified.

2. In a sash-supporter, the cylindrical case having an external screw-thread and two plunger-bearings, one of which is flat-sided, in combination with the longitudinal plunger fitted to said flat-sided bearing, and having, also, a projecting end of corresponding form, adapted to receive a wrench for turning the case to screw it into the jamb, substantially as described, and for the purpose specified.

3. The combination of the screw-threaded cylindrical case A, spring *c*, plunger C, forked at one end, and the roller *d*, substantially as described, and for the purpose specified.

CHARLES A. SCHAEFER.

Witnesses:
SILAS S. WILLARD,
E. KEMPSHALL.